US011461733B2

(12) United States Patent
Kobayashi et al.

(10) Patent No.: US 11,461,733 B2
(45) Date of Patent: Oct. 4, 2022

(54) BEHAVIOR ANALYSIS DEVICE, BEHAVIOR ANALYSIS SYSTEM, BEHAVIOR ANALYSIS METHOD, AND PROGRAM

(71) Applicant: NEC CORPORATION, Tokyo (JP)

(72) Inventors: Jun Kobayashi, Tokyo (JP); Shigetsu Saito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 735 days.

(21) Appl. No.: 16/074,658

(22) PCT Filed: Mar. 8, 2017

(86) PCT No.: PCT/JP2017/009246
§ 371 (c)(1),
(2) Date: Aug. 1, 2018

(87) PCT Pub. No.: WO2017/163879
PCT Pub. Date: Sep. 28, 2017

(65) Prior Publication Data
US 2019/0050792 A1    Feb. 14, 2019

(30) Foreign Application Priority Data

Mar. 23, 2016   (JP) .............................. JP2016-059300

(51) Int. Cl.
*G06Q 10/08*     (2012.01)
*G06Q 30/02*     (2012.01)

(52) U.S. Cl.
CPC ........... *G06Q 10/087* (2013.01); *G06Q 30/02* (2013.01); *G06Q 30/0201* (2013.01)

(58) Field of Classification Search
None
See application file for complete search history.

(56) References Cited

U.S. PATENT DOCUMENTS

2002/0178085 A1    11/2002   Sorensen
2007/0138268 A1*    6/2007   Tuchman ............... G06Q 30/06
                                                               235/383
(Continued)

FOREIGN PATENT DOCUMENTS

JP    2004-348681 A    12/2004
JP    2006-309280 A    11/2006
(Continued)

OTHER PUBLICATIONS

Carlos Ruiz et. al., "AIM3S: Autonomous Inventory Monitoring through Multi-Modal Sensing for Cashier-Less Convenience Stores," Nov. 13-14, 2019, Association for Computing Machinery, BuildSys '19, pp. 135-144 (Year: 2019).*

(Continued)

*Primary Examiner* — Amanda Gurski
(74) *Attorney, Agent, or Firm* — Sughrue Mion, PLLC

(57) ABSTRACT

A behavior analysis device includes an approach information acquisition unit configured to acquire approach information indicating whether or not a person has approached a shelf on which a plurality of goods are displayed, a determination unit configured to determine as stockout information a position of a stockout item which is out of stock among the plurality of goods displayed on the shelf and a stockout of the stockout item, and an analysis unit configured to perform behavior analysis of the person on the basis of the approach information and the stockout information.

5 Claims, 10 Drawing Sheets

(56) References Cited

U.S. PATENT DOCUMENTS

| | | | |
|---|---|---|---|
| 2015/0066569 A1* | 3/2015 | Ervolina | G06Q 10/06315 705/7.25 |
| 2015/0206188 A1* | 7/2015 | Tanigawa | G06Q 30/0261 705/14.58 |
| 2016/0114488 A1* | 4/2016 | Mascorro Medina | B25J 11/008 901/1 |
| 2016/0203499 A1* | 7/2016 | Yamashita | G06V 20/52 705/7.29 |
| 2020/0125888 A1* | 4/2020 | Hacker | G06V 10/82 |
| 2022/0051179 A1* | 2/2022 | Savvides | G06V 20/52 |

FOREIGN PATENT DOCUMENTS

| | | | |
|---|---|---|---|
| JP | 2009-126660 A | | 6/2009 |
| JP | 2011-253344 A | | 12/2011 |
| JP | 2011253344 A | * | 12/2011 |
| JP | 2015-041194 A | | 3/2015 |

OTHER PUBLICATIONS

Katia Campo et. al., "Towards Understanding Consumer Response to Stock-Outs," 2000, Journal of Retailing, vol. 76(2), pp. 219-242 (Year: 2000).*

International Search Report for PCT/JP2017/009246 dated Jun. 6, 2017 [PCT/ISA/210].

* cited by examiner

FIG. 5

| GROUP NUMBER | SENSING TIME | GOODS IDENTIFICATION INFORMATION |
|---|---|---|
| ⋮ | ⋮ | ⋮ |

FIG. 6

| GOODS IDENTIFICATION INFORMATION | STOCKOUT START TIME | STOCKOUT END TIME |
|---|---|---|
| ⋮ | ⋮ | ⋮ |

# BEHAVIOR ANALYSIS DEVICE, BEHAVIOR ANALYSIS SYSTEM, BEHAVIOR ANALYSIS METHOD, AND PROGRAM

CROSS REFERENCE TO RELATED APPLICATIONS

This application is a National Stage of International Application No. PCT/JP2017/009246 filed Mar. 8, 2017, claiming priority based on Japanese Patent Application No. 2016-059300 filed Mar. 23, 2016, the content of which is incorporated herein by reference.

TECHNICAL FIELD

The present invention relates to a behavior analysis device, a behavior analysis system, a behavior analysis method, and a program.

BACKGROUND ART

Behavior analysis of customers at a store may be performed, for example, for the purpose of recognition of purchasing characteristics of the customers. For example, Patent Document 1 describes the acquisition of information such as whether or not customers have touched goods or whether or not the customers have purchased touched goods.

CITATION LIST

Patent Literature

[Patent Document 1]
Japanese Unexamined Patent Application, First Publication No. 2011-253344

SUMMARY OF INVENTION

Technical Problem

When goods are out of stock, the stockout of the goods are likely to affect the behavior of customers. Therefore, it is preferable to reflect a situation of a stockout of goods in the behavior analysis in order to improve the accuracy of behavioral analysis. On the other hand, in Patent Document 1, information such as a display position of goods or the presence or absence of a special sale tag is used for behavior analysis, but does not reflect a situation of a stockout of goods in the behavior analysis.

An object of the present invention is to provide a behavior analysis device, a behavior analysis system, a behavior analysis method, and a program capable of solving the above-described problems.

Solution to Problem

According to a first aspect of the present invention, a behavior analysis device includes an approach information acquisition unit configured to acquire approach information indicating whether or not a person has approached a shelf on which a plurality of goods are displayed; a determination unit configured to determine as stockout information a position of a stockout item which is out of stock among the plurality of goods displayed on the shelf and a stockout of the stockout item; and an analysis unit configured to perform behavior analysis of the person on the basis of the approach information and the stockout information.

According to a second aspect of the present invention, a behavior analysis system includes a sensor configured to determine approach of a person to a shelf on which a plurality of goods are displayed; an approach information acquisition unit configured to acquire approach information indicating whether or not a person has approached the shelf on which the plurality of goods are displayed; a determination unit configured to determine as stockout information a position of a stockout item which is out of stock among the plurality of goods displayed on the shelf and a stockout of the stockout item; and an analysis unit configured to perform behavior analysis of the person on the basis of the approach information and the stockout information.

According to a third aspect of the present invention, a behavior analysis system includes a behavior analysis device and an output device, wherein the behavior analysis device includes an approach information acquisition unit configured to acquire approach information indicating whether or not a person has approached a shelf on which a plurality of goods are displayed; an analysis unit configured to perform behavior analysis of the person on the basis of the approach information; and a determination unit configured to determine as stockout information a position of a stockout item which is out of stock among the plurality of goods displayed on the shelf and a stockout of the stockout item, and wherein the output device includes an output generation unit configured to generate output information on the basis of the stockout information acquired from the behavior analysis device and analysis results of the behavior analysis device.

According to a fourth aspect of the present invention, a behavior analysis method includes an approach information acquisition step of acquiring approach information indicating whether or not a person has approached a shelf on which a plurality of goods are displayed; a stockout determination step of determining as stockout information a position of a stockout item which is out of stock among the plurality of goods displayed on the shelf and a stockout of the stockout item; and an analysis step of performing behavior analysis of the person on the basis of the approach information and the stockout information.

According to a fifth aspect of the present invention, a program causes a computer to execute an approach information acquisition step of acquiring approach information indicating whether or not a person has approached a shelf on which a plurality of goods are displayed; a stockout determination step of determining as stockout information a position of a stockout item which is out of stock among the plurality of goods displayed on the shelf and a stockout of the stockout item; and an analysis step of performing behavior analysis of the person on the basis of the approach information and the stockout information.

Advantageous Effects of Invention

According to the present invention, it is possible to reflect a situation of a stockout of goods in behavior analysis.

BRIEF DESCRIPTION OF DRAWINGS

FIG. 5 is an illustrative diagram showing an example of a data structure of post-association information stored in a storage unit according to the embodiment.

FIG. 6 is an illustrative diagram showing an example of a data structure of stockout period information stored in the storage unit according to the embodiment.

DESCRIPTION OF EMBODIMENTS

Figure 1:
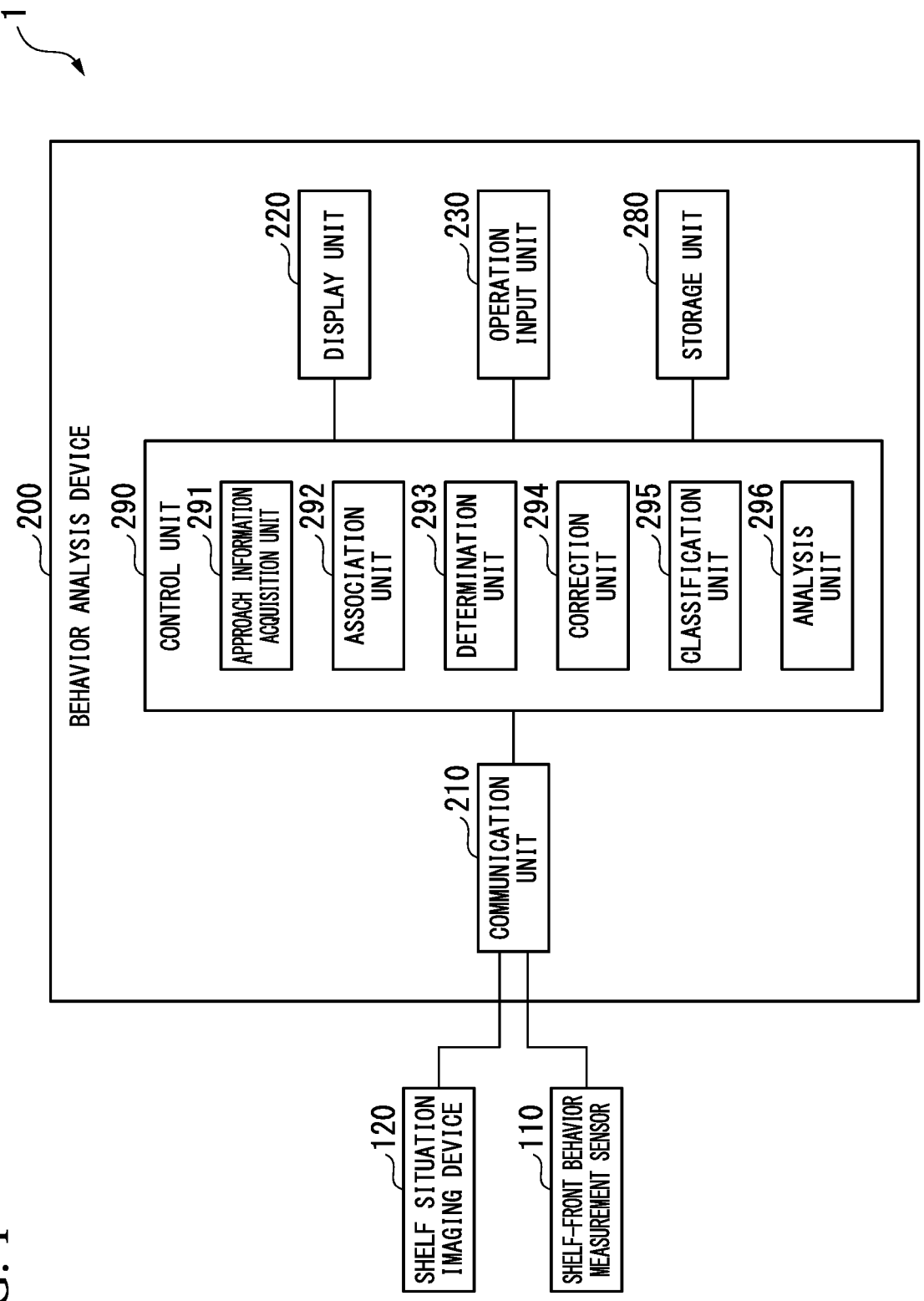
FIG. 1 is a schematic block diagram showing a functional configuration of a behavior analysis system according to an embodiment of the present invention.

Hereinafter, embodiments of the present invention will be described, but the following embodiments do not limit the invention according to the claims. In addition, not all combinations of the features described in the embodiments are necessarily essential to a solution means of the invention. FIG. 1 is a schematic block diagram showing a functional configuration of a behavior analysis system according to an embodiment of the present invention. As shown in FIG. 1, the behavior analysis system 1 includes a shelf-front behavior measurement sensor 110, a shelf situation imaging device 120, and a behavior analysis device 200. The behavior analysis device 200 includes a communication unit 210, a display unit 220, an operation input unit 230, a storage unit 280, and a control unit 290. The control unit 290 includes an approach information acquisition unit 291, an association unit 292, a determination unit 293, a correction unit 294, a classification unit 295, and an analysis unit 296.

The behavior analysis system 1 analyzes behavior of a person in front of shelves. Specifically, the behavior analysis system 1 acquires an index value indicating the behavior of the person in front of the shelves. A user of the behavior analysis system 1 can recognize behavior of the person in front of the shelves by referring to this index value. The front of shelves described here is a front of goods display shelves (in particular, the vicinity of a front face), and the shelf-front behavior described here is a behavior that a person conducts in front of the goods display shelves. Hereinafter, the goods display shelves are simply referred to as shelves. The user of the behavior analysis system 1 is simply referred to as a user.

Hereinafter, a person to be analyzed by the behavior analysis system 1 is also referred to as a customer. That is, the behavior analysis system analyzes the behavior of customers visiting a store.

The shelf-front behavior measurement sensor 110 is a sensor that is provided to determine a shelf-front behavior. For example, a distance sensor provided toward a lower side of the front face of the shelves from an upper side can be used as the shelf-front behavior measurement sensor 110. When the customer puts out his or her hand toward the shelves, the shelf-front behavior measurement sensor 110 determines the position in a horizontal direction and the position in a vertical direction of the hand of the customer in front of the shelves. The behavior analysis device 200 can estimate goods that the customer put out their hand toward on the basis of the position determined by the shelf-front behavior measurement sensor 110.

The shelf situation imaging device 120 includes a camera, which is provided in front of the shelves and captures a moving image or a still image, and images a state of the front of the shelves and a state of the shelves continuously or at predetermined time intervals.

On the basis of the image captured by the shelf situation imaging device 120, the behavior analysis device 200 can determine a timing from when the customer stops in front of the shelves to leaving the shelves. Accordingly, the behavior analysis device 200 can determine putting out of the hand toward the shelves performed in a period between when the customer stopped in front of the shelves and when the customer leaves there, as a sequence of behavior of which a customer put out his or her hand toward the shelves.

Further, the behavior analysis device 200 can compare images before and after the customer puts out a hand toward the shelves with each other to determine that the customer has picked up goods with his or her hand and the customer has put the picked up goods back on the shelves.

An example of a disposition of the shelf-front behavior measurement sensor 110 and the shelf situation imaging device 120 will be described with reference to FIGS. 2 and 3.

Figure 2:
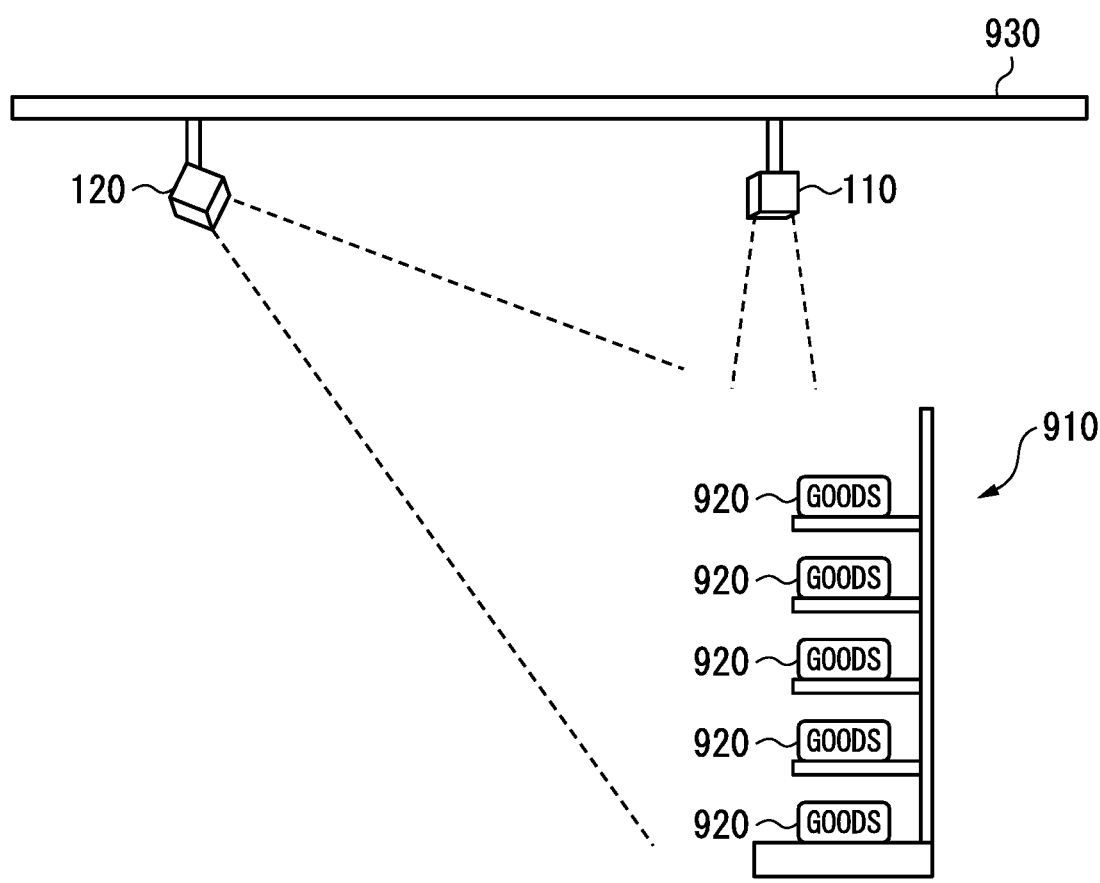
FIG. 2 is an illustrative diagram showing a disposition example of a shelf-front behavior measurement sensor and a shelf situation imaging device when shelves are seen from a side in the embodiment.

FIG. 2 is an illustrative diagram showing a disposition example of the shelf-front behavior measurement sensor 110 and the shelf situation imaging device 120 when the shelves is seen from the side. In the example shown in FIG. 2, the shelf-front behavior measurement sensor 110 is installed downward from a ceiling 930 above the front face of the shelves 910. The shelves 910 are shelves with a plurality of sections, and goods 920 are placed in each section. When the customer puts out the hand toward the shelves 910, the shelf-front behavior measurement sensor 110 measures a distance between the shelf-front behavior measurement sensor 110 itself and the hand. By using the measured distance, the behavior analysis device 200 can determine a section of the shelves 910 toward which the customer puts out the hand.

The camera of the shelf situation imaging device 120 is installed at a position and in a direction in which the shelves 910 is imaged from the ceiling 930 in front of the shelves 910. For example, the shelf situation imaging device 120 may include one camera, and the camera is installed at a position and in a direction at which the entire front face of the shelves 910 can be imaged. Alternatively, when the entire front face of the shelves 910 cannot be imaged by one camera, the shelf situation imaging device 120 may include a plurality of cameras.

Figure 3:
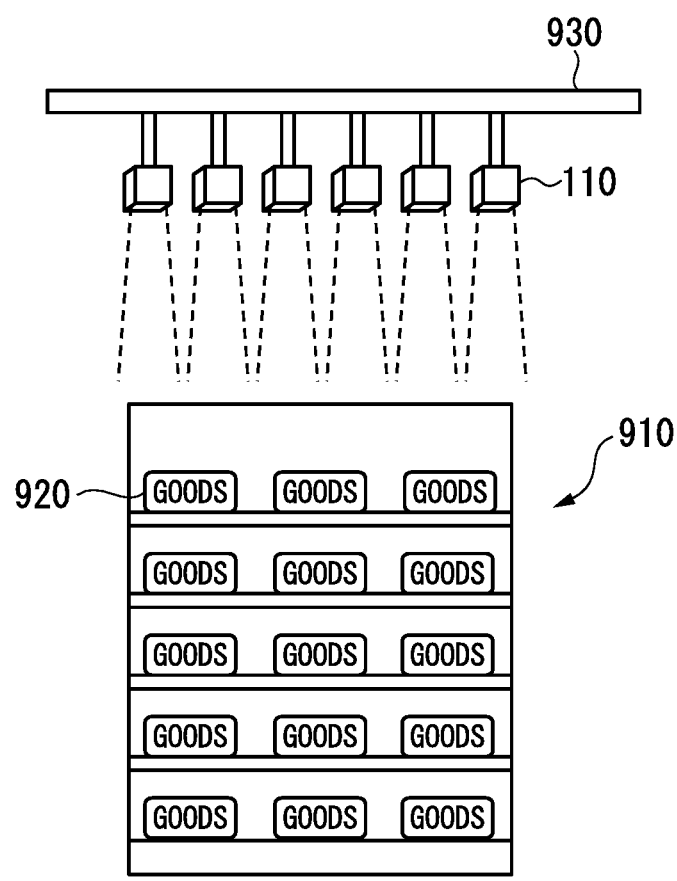
FIG. 3 is an illustrative diagram showing a disposition example of a shelf-front behavior measurement sensor when shelves are viewed from the front in the embodiment.

FIG. 3 is an illustrative diagram showing a disposition example of the shelf-front behavior measurement sensor 110 when the shelves are viewed from the front. In the example of FIG. 3, a plurality of shelf-front behavior measurement sensors 110 are disposed on the ceiling 930 in a width direction of the shelves 910. When the customer puts out the hand toward the shelves 910, the behavior analysis device 200 can determine a position of the hand in a horizontal direction of the shelves 910 by specifying the shelf-front behavior measurement sensor 110 that has determined the hand.

However, the shelf-front behavior measurement sensor 110 may be able to determine the position of the hand in a vertical direction of the shelves 910 and the position of the hand in the horizontal direction of the shelves 910 when the customer puts out the hand toward the shelves 910. For example, as the shelf-front behavior measurement sensor 110, one set of three-dimensional cameras may be installed above the front face of the shelves 910 to image the front face of the shelves in the vertical direction.

An installation position of the shelf-front behavior measurement sensor 110 is not limited to a position above the shelves 910. For example, the shelf-front behavior measurement sensor 110 may be installed to the side of the shelves 910 to sense the front side of the shelves 910 sideways.

The behavior analysis device 200 analyzes the shelf-front behavior on the basis of the sensing data from the shelf-front behavior measurement sensor 110.

Specifically, as described with reference to FIGS. 2 and 3, when the customer puts out the hand toward the shelves 910, the behavior analysis device 200 determines the position of the hand in the vertical direction of the shelves 910 and the position of the hand in the horizontal direction of the shelves 910 on the basis of the sensing data from the shelf-front behavior measurement sensor 110. In addition, the behavior analysis device 200 has stored the disposition of the goods 920 on the shelves 910 in advance, and estimates the goods 920 toward which the customer puts out the hand, on the basis of the determined position of the hand of the customer. The behavior analysis device 200 is configured to perform analysis of the shelf-front behavior, such as counting of the number of times the customer puts out the hand toward the goods 920 for each of the goods 920, and displays analysis results.

The behavior analysis device 200 determines that goods 920 are out of stock in the shelves 910 on the basis of the image captured by the shelf situation imaging device 120. The behavior analysis device 200 reflects the determined stockout situation of the goods 920 in the analysis of the shelf-front behavior. For example, when the behavior analysis device 200 counts the number of times the customer has not picked up the predetermined goods 920 with the hand (for example, the number of times other goods 920 have been picked up), the behavior analysis device 200 excludes a period of time in which the goods 920 are out of stock from a counting period. Accordingly, the behavior analysis device 200 can obtain analysis results in which a likelihood of a false impression that the customer has not picked up the goods 920 with the hand since the goods 920 are not attractive being given to the user is reduced.

The behavior analysis device 200 is configured using, for example, a computer.

The communication unit 210 communicates with other devices. The communication unit 210 receives the sensing data from the shelf-front behavior measurement sensor 110. Further, the communication unit 210 receives the image captured by the shelf situation imaging device 120 as image data. The display unit 220 includes, for example, a display screen such as a liquid crystal panel or a light-emitting diode (LED) panel, and displays various images under the control of the display unit 220. The display unit 220 displays a customer behavior index value such as a counting result of the number of times the customer puts out the hand toward the goods. The customer behavior index value referred to herein is an index value that the analysis unit 296 has calculated regarding the behavior of customer.

For example, the display unit 220 superimposes and displays the customer behavior index value on the image of the shelves 910.

Figure 4:
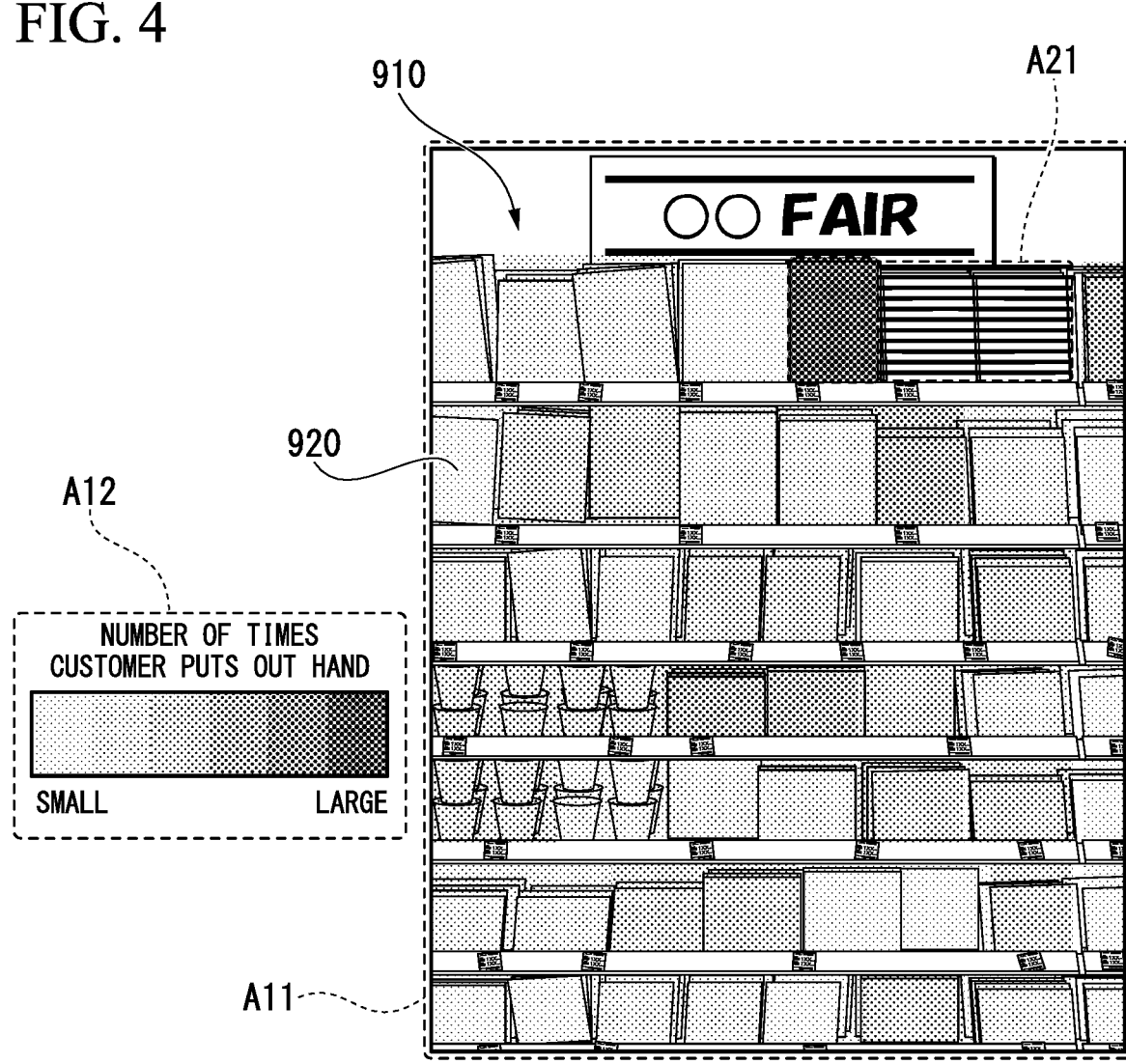
FIG. 4 is an illustrative diagram showing an example of display of a customer behavior index value by a display unit according to the embodiment.

FIG. 4 is an illustrative diagram showing an example of a display of the customer behavior index value by the display unit 220. In the example shown in FIG. 4, the display unit 220 displays an image of the shelves 910 in which the goods 920 are disposed, in an area A11. The display unit 220 is configured to perform display by applying a color to the image of the goods according to the number of times that a customer has put out a hand toward the goods. The display unit 220 displays a model example indicating an association between the number of times the customer puts out the hand toward the goods and the color, in an area A12. Accordingly, the display unit 220 displays the number of times the customer has put out the hand toward the goods in a heat map style. The heat map referred to herein is a display method by which a value of each element of a matrix is indicated by color.

In the example of FIG. 4, the goods shown in an area A21 are temporarily out of stock, and the display unit 220 displays the number of times the customer has put out the hand toward each of the goods in a period in which the goods are out of stock.

The number of times the customer has put out the hand toward the goods corresponds to an example of the customer behavior index value. The display unit 220 displays the customer behavior index value using a color applied to the image of the goods at a position of the image of the goods 920 in the image of the shelves 910.

However, a method by which the display unit 220 displays the customer behavior index value is not limited to a method of applying a color to the image of the goods, and may be any method by which the customer behavior index value can be presented to the user. For example, the display unit 220 may display the customer behavior index value using a graph.

The operation input unit 230 includes, for example, an input device such as a keyboard and a mouse and receives a user operation. For example, the operation input unit 230 receives a designation of the goods through a user operation for clicking on the goods 920 displayed on the display unit 220 using the mouse. Further, the operation input unit 230 receives, for example, a user operation for instructing a condition for calculating a customer behavior index value, such as the number of times the customer has put out the hand toward respective goods in the period in which the designated goods are out of stock.

The storage unit 280 stores various types of information. The storage unit 280 stores sensing data obtained by the shelf-front behavior measurement sensor 110 or data obtained by the control unit 290 processing the sensing data. For example, the storage unit 280 stores information in which the goods identification information indicating the goods 920 toward which the customer has put out the hand is associated with a time at which the shelf-front behavior measurement sensor 110 has determined the hand of the customer. Hereinafter, the information in which the goods identification information is associated with the time information indicating the sensing time is referred to as post-association information. The post-association information is generated by the association unit 292 and stored in the storage unit 280.

The storage unit 280 stores the information in which the goods identification information indicating the goods 920 toward which the customer has put out the hand is associated with a time at which the shelf-front behavior measurement sensor 110 has determined the hand of the customer in the post-association information, as a sequence of hand putting-out information of the same customer in the period from when the customer stops in front of the shelves to when the customer leaves the shelves. The goods identification information referred to herein is information for identifying the goods 920 placed on the shelves 910 for each of goods. It should be noted that, in the present embodiment, goods with the same specification (for example, goods with the same name) are regarded as the same goods. Predetermined information such as a goods name may be used as the goods identification information, or identification information dedicated to the behavior analysis system 1 may be defined.

FIG. 5 is an illustrative diagram showing an example of a data structure of post-association information stored in the storage unit 280. As shown in FIG. 5, the storage unit 280 stores a group number, a sensing time, and goods identification information in association with each other.

It should be noted that when one of sets of information in which the group number, the sensing time and the goods identification information are associated with each other is distinguished from all of the sets, one of the sets of information in which these are associated with each other is referred to as post-association information for one row. On the other hand, all of pieces of information in which these are associated with each other is referred to as all post-association information.

In the example of FIG. 5, the goods identification information indicates the goods 920 toward which the customer puts out a hand, which has been specified on the basis of the sensing data from the shelf-front behavior measurement sensor 110. The sensing time indicates a time at which the shelf-front behavior measurement sensor 110 has performed determination of an object indicated in the sensing data. For example, a time at which the communication unit 210 has received the sensing data may be used as the sensing time.

The group number is used as information for combining a sequence of hand putting-out determined from when the customer stops in front of the shelves to when the customer leaves the shelves in one group. The behavior analysis device 200 determines a timing from when the customer stops in front of the shelves to when the customer leaves the shelves on the basis of the captured image of the shelf situation imaging device and assigns the same group number to information based on the sensing data (a combination of the sensing time and the goods identification information) that the shelf-front behavior measurement sensor 110 has transmitted in a period thereof. Accordingly, it is possible to determine that the same customer has put out the hand toward the shelves 910 a plurality of times.

However, the information stored in the storage unit 280 is not limited to the information in which the sensing time and the goods identification information shown in the example of FIG. 5 are associated with each other. For example, the storage unit 280 may store the sensing data from the shelf-front behavior measurement sensor 110 and the time information indicating the sensing time in association with each other. Alternatively, the storage unit 280 may store the information obtained by converting the sensing data from the shelf-front behavior measurement sensor 110 to the position in the vertical direction and the position in the horizontal direction in the shelves 910 in a format of values of coordinates.

The storage unit 280 stores the stockout period information indicating a stockout start time and a stockout end time during which any of the goods 920 is out stock. FIG. 6 is an illustrative diagram showing an example of a data structure of the stockout period information stored in the storage unit 280. As shown in FIG. 6, the storage unit 280 stores goods identification information, stockout start time, and stockout end time in association with each other.

The goods identification information in the stockout period information indicates the goods that are out of stock. The stockout start time indicates a time at which the goods indicated by the goods identification information become out of stock. For example, after the customer picks up the last one of the same goods with a hand, a time at which the customer leaves the shelves can be set as the stockout start time. The stockout end time indicates a time at which the stockout of the goods indicated by the goods identification information has ended. For example, a time at which a store clerk has replenished the goods in the shelves 910 can be set as the stockout end time.

The stockout period information is generated by the determination unit 293. Specifically, the determination unit 293 writes the goods identification information and the stockout start time at which the stockout of the goods have been determined, to the stockout period information. When determining the end of the stockout, the determination unit 293 writes the stockout end time to a corresponding column of the stockout period information.

It should be noted that when one of sets of information in which the goods identification information, the stockout start time and the stockout end time are associated with each other is distinguished from all of the sets, one of the sets of information in which these are associated with each other is referred to as stockout period information for one row. On the other hand, all of pieces of information in which these are associated with one another are referred to as all of stockout period information.

The storage unit 280 stores the images captured by the shelf situation imaging device 120 in association with an imaging time in time series.

The storage unit 280 is realized using a storage device included in the behavior analysis device 200. The storage device included in the behavior analysis device 200 may be a storage device built into the behavior analysis device 200 or may be a storage device externally attached to the behavior analysis device 200.

The control unit 290 controls each unit of the behavior analysis device 200 such that various functions are executed. The control unit 290 is realized, for example, by a central processing unit (CPU) included in the behavior analysis device 200 reading and executing a program from the storage unit 280.

The approach information acquisition unit 291 acquires the approach information. The approach information referred to herein is information indicating whether or not a person has approached the shelves 910 and a position in the shelves 910 when the person has approached the shelves 910 at respective times.

Specifically, when the shelf-front behavior measurement sensor 110 determines an object (in particular, the hand of the customer), the approach information acquisition unit 291 converts the sensing data to a coordinate value on the front face of the shelves 910. For example, the storage unit 280 stores information indicating the position at which the shelf-front behavior measurement sensor 110 determines an object in advance for each shelf-front behavior measurement sensor 110 in the horizontal direction of the shelves 910. The approach information acquisition unit 291 reads information on the position at which the shelf-front behavior measurement sensor 110 determines the object from the storage unit 280 according to the shelf-front behavior measurement sensor 110 that has determined the object.

Further, the approach information acquisition unit 291 reads the distance between the object determined by the shelf-front behavior measurement sensor 110 and the shelf-front behavior measurement sensor 110 itself from the sensing data. The approach information acquisition unit 291 converts the read distance to the position in the vertical direction of the shelves 910.

The approach information acquisition unit 291 generates the approach information by associating reception time information of the sensing data as the time information indicating the sensing time with the corresponding coordinate value. The presence of the approach information indicates that the shelf-front behavior measurement sensor 110 has determined the object.

A case in which the shelf-front behavior measurement sensor 110 has determined the object is regarded as at least a part of a body of the customer (in particular, a hand of the customer) having approached the shelves 910. In this respect, the approach information indicates whether or not at least a part of the body of the customer has approached the shelves 910 according to the presence or absence of the information. The approach information indicates whether or not at least a part of the body of the customer has approached the shelves 910 and the position in the shelves 910 when the part approaches the shelves 910 using a coordinate value. A position indicated by the coordinates is a position on the shelves 910 that at least a part of the body of a customer has approached.

The association unit 292 associates the approach information generated by the approach information acquisition unit 291 with any one of the goods 920 according to the position indicated by the approach information. For example, the storage unit 280 stores the information in which the position information determined from the sensing data is associated with any of the goods 920 by the approach information acquisition unit 291 in advance. Further, the storage unit 280 stores the position of the goods 920 on the shelves 910 as two-dimensional coordinate values in the horizontal direction and the vertical direction of the shelves 910 for each of the goods 920 placed on the shelves 910 in advance. The association unit 292 associates the approach information with the goods 920 by reading the goods 920 associated with the coordinate value indicated by the approach information generated by the approach information acquisition unit 291 from the storage unit 280.

The association unit 292 generates information in which the goods identification information for identifying the associated goods 920 is associated with the time information indicating the sensing time and stores the information in the storage unit 280. As described above, the information in which the goods identification information is associated with the time information indicating the sensing time generated by the association unit 292 is referred to as post-association information. The post-association information corresponds to an example of information indicating the goods associated with the approach information.

The determination unit 293 determines the stockout of the goods displayed on the shelves 910 and the position thereof as the stockout information. Specifically, the determination unit 293 calculates a difference image between an image captured by the shelf situation imaging device 120 before the customer stops in front of the shelves and an image captured by the shelf situation imaging device 120 after the customer has left the shelves. When the determination unit 293 determines that an area in which goods have disappeared has been newly generated in the difference image, the determination unit 293 determines that these goods are out of stock.

When the determination unit 293 determines that the goods are out of stock, the determination unit 293 converts a position at which the stockout of the goods has been determined in the image of the shelves 910 into a position of the shelves 910. The determination unit 293 specifies the goods placed at the position by referring to disposition information of the goods 920 in the shelves 910 stored by the storage unit 280 in advance.

Alternatively, the determination unit 293 may specify the goods, which are out of stock, by analyzing the image before the goods being out of stock. For example, the determination unit 293 specifies the goods, which are out of stock, by performing pattern matching of the image of the goods shown in the area in which the stockout has been determined with the image of each of the goods stored in the storage unit 280.

That is, the determination unit 293 determines the presence or absence of the stockout of the goods 920 in the shelves 910, specifies the goods 920 that are out of stock, and generates stockout information indicating the stockout of the goods 920 and the position of the goods 920 that are out of stock.

When it is determined that the goods corresponding to the approach position are out of stock, the correction unit 294 is configured to perform correction to indicate that the hand of the person has approached a position adjacent to the approach position.

Specifically, the correction unit 294 reads the position at which a person has approached the shelves 910 from the approach information. The correction unit 294 acquires the position information of the goods determined to be out of stock by the determination unit 293. For example, the determination unit 293 may determine the position in the image of shelves 910 of the goods, which has been determined to be out of stock, convert the determined position to a position in the shelves 910, and notify the correction unit 294 of the position. Alternatively, the storage unit 280 may store the disposition of each of the goods 920 in the shelves 910 in advance such that the correction unit 294 can read the position of the goods determined to be out of stock by the determination unit 293 from the storage unit 280.

The correction unit 294 determines whether or not the position at which the person has approached the shelves 910 matches the position of the stockout in the shelves 910. When correction unit 294 determines that the two positions match, the correction unit 294 corrects the position at which the person has approached the shelves 910.

It is generally considered that a customer performs putting-out of his or her hand toward the shelves 910 to pick up the goods 920 or to touch the goods 920. Further, it is considered that the customer usually does not put out the hand toward the position at which the goods are out of stock. On the other hand, when the approach information acquisition unit 291 determines that a customer has put out a hand toward a position at which goods are out of stock, it is assumed that this is because a customer putting out a hand toward goods next to the goods, which are out of stock, has been determined as putting out of a hand toward a position of the stockout of the goods according to the accuracy of the assessment of the shelf-front behavior assessment sensor 110. Therefore, the correction unit 294 corrects the putting-out of the hand toward the position of the goods, which are out of stock, to the putting-out of the hand toward the position of the goods adjacent to the goods, which are out of stock. Accordingly, the behavior analysis device 200 can determine the goods 920 toward which the customer has put out the hand with higher accuracy.

The classification unit 295 classifies the approach information for each stockout situation determined by the determination unit 293. Specifically, when the determination unit 293 has determined that any of the goods 920 is out of stock, the classification unit 295 classifies the approach information into during the stockout of the goods 920 and when there are the goods 920 (before the stockout and after replenishment) according to a time of the determination (sensing time).

The analysis unit 296 is configured to perform analysis of the behavior of a person on the basis of the approach information and the stockout information. Specifically, the analysis unit 296 calculates an index value regarding the behavior of the customer using the approach information classified by the classification unit 295.

Further, the analysis unit 296 calculates an index value regarding the behavior of the customer with respect to the goods on the basis of the approach information when the determination unit 293 has determined that at least specific goods are not out of stock. Accordingly, the analysis unit 296 is configured to ignore information indicating that the customer did not pick up the goods, as noise, when the goods are out of stock. The behavior analysis system 1 presents this index value to the user, such that it is possible to reduce a likelihood of the user erroneously recognizing the goods as being not attractive.

The analysis unit 296 calculates an index value regarding the behavior of the customer on the basis of the approach information when the determination unit 293 has determined that at least one of the goods is out of stock.

The behavior analysis system 1 presents this index value to the user such that the user can infer a situation in which the customer has reluctantly picked up the goods since other goods are out of stock.

Further, the behavior analysis system 1 presents the index value to the user such that the user can obtain information on the shelf-front behavior of the customer when popular goods have been out of stock. For example, the user can recognize the behavior that the customer leaves without stopping in front of the shelves.

Figure 7:
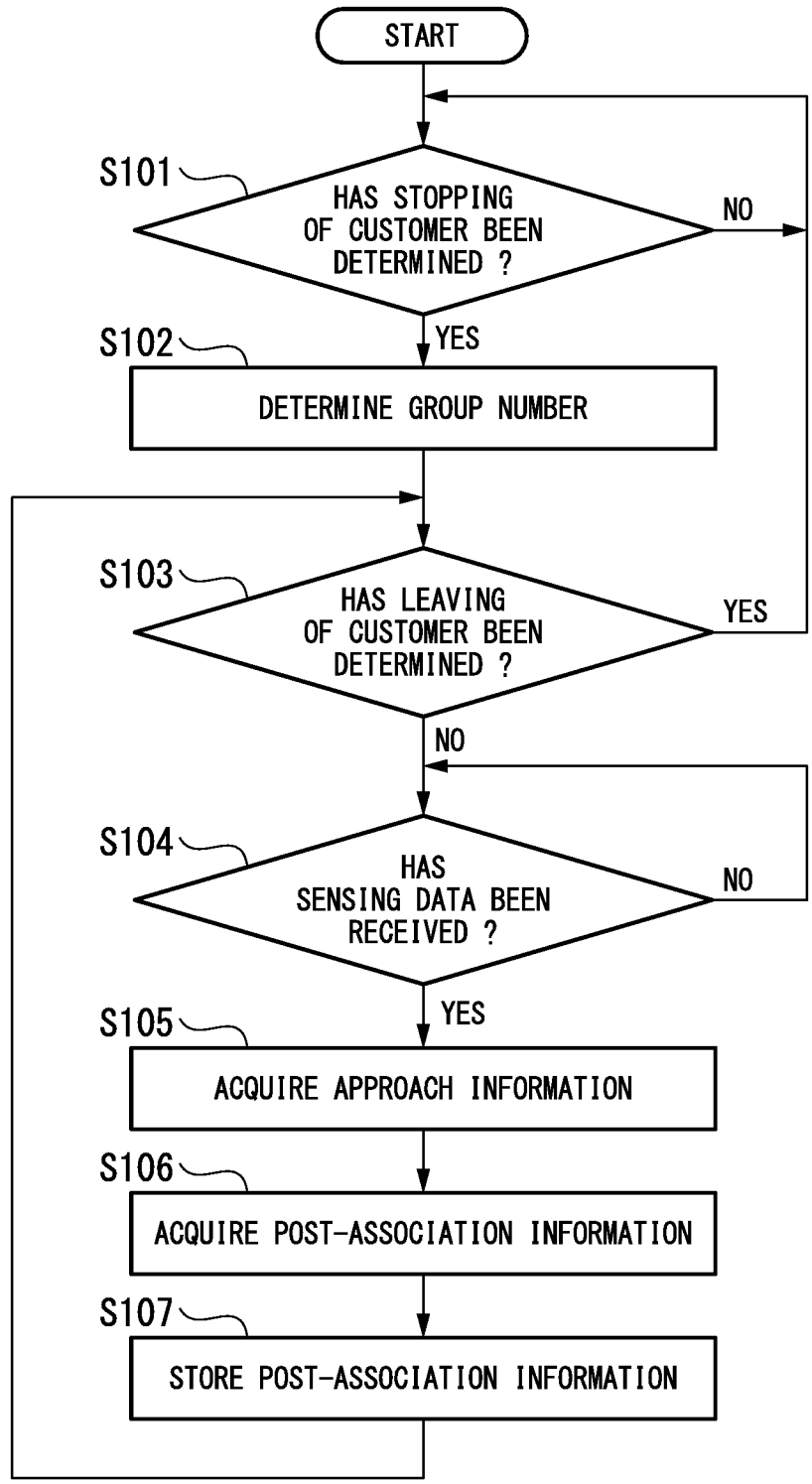
FIG. 7 is a flowchart showing an example of a processing procedure in which the behavior analysis device according to the embodiment generates post-association information.

An operation of the behavior analysis system 1 will be described with reference to FIGS. 7 to 9. FIG. 7 is a flowchart showing an example of a processing procedure in which the behavior analysis device 200 generates post-association information. When a power supply of the behavior analysis device 200 itself is connected (ON) and the behavior analysis device 200 enters an operation state, the behavior analysis device 200 starts a process of FIG. 7.

In the process of FIG. 7, the approach information acquisition unit 291 determines whether or not the customer stopping in front of the shelf has been detected (step S101). Specifically, the approach information acquisition unit 291 determines that the customer stopping in front of the shelves has been detected when the approach information acquisition unit 291 has determined that there is a customer who has not been in front of the shelves in the image captured by the shelf situation imaging device 120. When a plurality of customers are shown in the image captured by the shelf situation imaging device 120, the approach information acquisition unit 291 may determine whether or not the customer has been determined to stop in front of the shelves for each of the plurality of customers.

When it is determined that the customer stopping in front of the shelves is not detected (step S101: NO), the approach information acquisition unit 291 returns to step S101. That is, the behavior analysis device 200 waits for the customer to stop in in front of the shelves. When it is determined in step S101 that the customer stopping in front of the shelves is determined (step S101: YES), the approach information acquisition unit 291 determines a group number for the customer stopping in the shelves (step S102). For example, an initial value of the group number may be set to 0, and the approach information acquisition unit 291 may add 1 to the group number each time the customer stopping in front of the shelves is determined.

The approach information acquisition unit 291 determines whether or not leaving of the customer from in front of the shelves has been determined (step S103). Specifically, the approach information acquisition unit 291 determines that the leaving of the customer from in front of the shelves has been determined when it is determined that any customer who has been so far in front of the shelves no longer exists in the image captured by the shelves situation imaging device 120. When a plurality of customers are shown in the image captured by the shelves situation imaging device 120, the approach information acquisition unit 291 may determine whether or not the leaving of the customer has been determined for each of a plurality of customers.

When the approach information acquisition unit 291 has determined that leaving of the customer in front of the shelves has been determined (step S103: YES), the approach information acquisition unit 291 returns to step S101.

When the approach information acquisition unit 291 determines in step S103 that the customer stopped in front of the shelves has not been determined (step S103: NO), the approach information acquisition unit 291 determines whether or not the sensing data from the shelf-front behavior measurement sensor 110 has been acquired (step S104). Specifically, the approach information acquisition unit 291 determines whether or not the communication unit 210 has received the sensing data.

When the approach information acquisition unit 291 determines that the sensing data has not been acquired (step S104: NO), the approach information acquisition unit 291 returns to step S104. That is, the behavior analysis device 200 waits for sensing data from the shelf-front behavior measurement sensor 110.

When the approach information acquisition unit 291 determines that the sensing data has been acquired in step S104 (step S104: YES), the approach information acquisition unit 291 generates approach information (step S105). Specifically, the approach information acquisition unit 291 converts the sensing data received by the communication unit 210 into a two-dimensional coordinate value in the front face of the shelves 910 and generates approach information on the basis of the obtained two-dimensional coordinate value.

The association unit 292 generates post-association information on the basis of the two-dimensional coordinate value obtained in step S105 (step S106). Specifically, the association unit 292 generates information in which the group number determined in step S102, the sensing time and the goods identification information obtained from the two-dimensional coordinate value are combined, as post-association information for one row as in the example of the data structure of FIG. 6.

The association unit 292 causes the storage unit 280 to store the post-association information (information for one row) obtained in step S106 (step S107).

After step S107, the association unit 292 returns to step S103.

Figure 8:
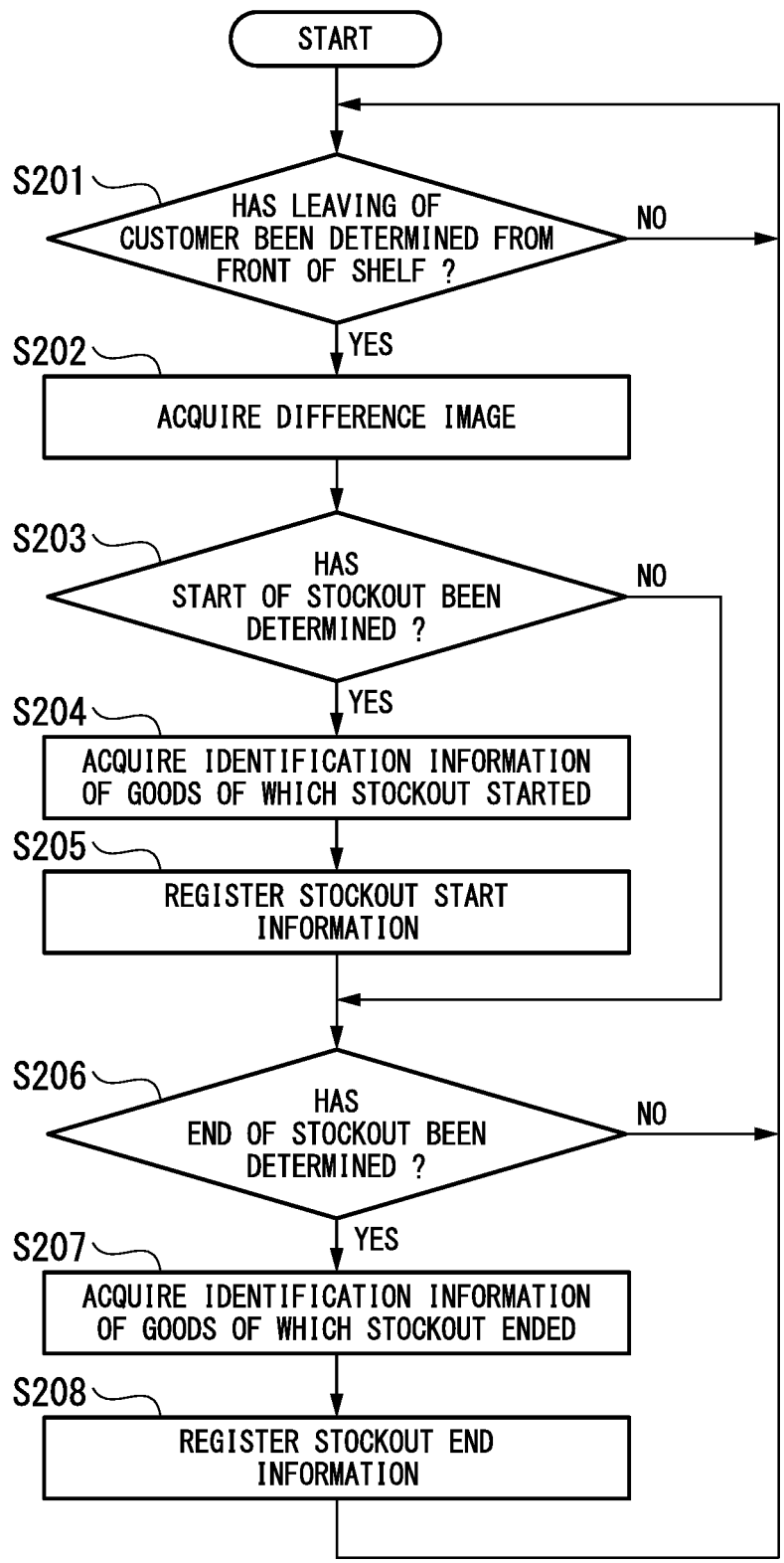
FIG. 8 is a flowchart showing an example of a processing procedure in which the behavior analysis device according to the embodiment generates stockout period information.

FIG. 8 is a flowchart showing an example of a processing procedure in which the behavior analysis device 200 generates the stockout period information. When a power supply of the behavior analysis device 200 itself is connected (ON) and the behavior analysis device 200 enters an operation state, the behavior analysis device 200 starts the process of FIG. 8.

In the process of FIG. 8, the determination unit 293 determines whether or not the leaving of the customer from in front of the shelves has been detected (step S201). Specifically, the determination unit 293 compares the image captured latest by the shelf situation imaging device 120 with the image captured predetermined time ago (for example, 30 seconds ago) by the shelf situation imaging device 120. When the determination unit 293 determines that a customer shown in the image captured the predetermined time ago is not shown in the latest image, the determination unit 293 determines that the leaving of the customer from in front of the shelves has been detected.

When it is determined that the leaving of the customer from in front of the shelves is not detected (step S201: NO), the determination unit 293 returns to step S201.

When it is determined that the leaving of the customer from in front of the shelves has been detected (step S201: YES), the determination unit 293 acquires a difference image between before the customer stops in in front of the shelves and after the customer has left the shelves (step S202). In this case, the determination unit 293 acquires an image after the customer has left the shelves, from the latest image in the step S201. The determination unit 293 acquires an image before the customer stops in in front of the shelves by referring to the captured images of the shelves situation imaging device 120 stored in the storage unit 280 in a reverse time series (that is, in an order from the current to the past). The determination unit 293 calculates a difference image between the image before the customer stops in in front of the shelves and the image after the customer has left in front of the shelves.

The determination unit 293 analyzes the difference image obtained in step S202 and determines whether or not the start of a stockout of any goods 920 has been determined (step S203). Specifically, when the determination unit 293 determines that goods shown in the past image are not shown in the latest image with respect to a difference area shown in the difference image, the determination unit 293 determines that the start of the stockout of the goods has been determined.

When it is determined that the start of the stockout of the goods has been determined (step S203: YES), the determination unit 293 acquires the goods identification information indicating the goods determined for the stockout of the goods to have started (step S204). Specifically, as described above, the determination unit 293 specifies the goods that are out of stock on the basis of the position at which the stockout of the goods is determined, and acquires the goods identification information indicating the corresponding goods. Alternatively, the determination unit 293 may specify the goods that are out of stock through pattern matching on the basis of the image of the goods of which the stockout has been determined and acquire the goods identification information indicating the goods, as described above.

The determination unit 293 registers stockout start information (step S205). The stockout start information referred to herein is a combination of the goods identification information and the stockout start time in the stockout period information. Specifically, the determination unit 293 newly generates the stockout period information for one row, and writes the identification information of the goods of which the start of the stockout has been determined and the stockout start time (for example, an imaging time of the latest image of the shelf situation imaging device 120 acquired in step S201). In step S205, the determination unit 293 sets the stockout end time in the newly generated stockout period information for one row as a blank.

The determination unit 293 analyzes the difference image obtained in step S202 and determines whether or not an end of a stockout of any goods 920 has been determined (step S206). Specifically, when the determination unit 293 determines that the goods not shown in the past image are shown in the latest image with respect to the difference area shown in the difference image, the determination unit 293 determines that the end of the stockout has been determined.

When the determination unit 293 determines that the end of the stockout has been determined (step S206: YES), the determination unit 293 acquires the goods identification information indicating the goods of which the stockout has been determined to have ended (step S207). Specifically, the determination unit 293 specifies the goods of which the stockout has ended on the basis of the position at which the end of the stockout has been determined, and acquires the goods identification information indicating the goods. Alternatively, the determination unit 293 may specify the goods of which the stockout has ended through pattern matching on the basis of the image of the goods of which the end of the stockout has been determined, and acquire the goods identification information indicating the goods.

The determination unit 293 registers stockout end information (step S208). The stockout end information referred to herein is the stockout end time in the stockout period information. Specifically, the determination unit 293 determines a row in which the goods identification information corresponds to the goods identification information acquired in step S207 and the stockout end time is a blank from the stockout period information. The determination unit 293 writes the stockout end time (for example, an imaging time of the latest image of the shelf situation imaging device 120, which has been acquired in step S201) to a column of the stockout end time of the determined row.

The determination unit 293 returns to step S201 after step S208. When the determination unit 293 has determined that the stockout start has not been determined in step S203 (step S203: NO), the determination unit 293 proceeds to step S205. When the determination unit 293 has determined that an end of any stockout has not been determined in step S206 (step S206: NO), the determination unit 293 returns to step S201.

However, the method by which the determination unit 293 determines the stockout is not limited to the method described with reference to FIG. 8. For example, the behavior analysis system 1 may include a distance sensor array in which distance sensors that measure a distance from the front of the shelves 910 toward the shelves 910 are disposed throughout the entire front face of the shelves 910. When any of the distance sensors included in the distance sensor array has determined that there is no object to the back of the shelves 910, the determination unit 293 determines that the goods 920 placed at the position are out of stock.

Alternatively, when it is determined that the goods 920 corresponding to the number of displayed goods have been purchased through the counting of a point of sale (POS), the determination unit 293 may determine that the goods 920 are out of stock.

Figure 9:
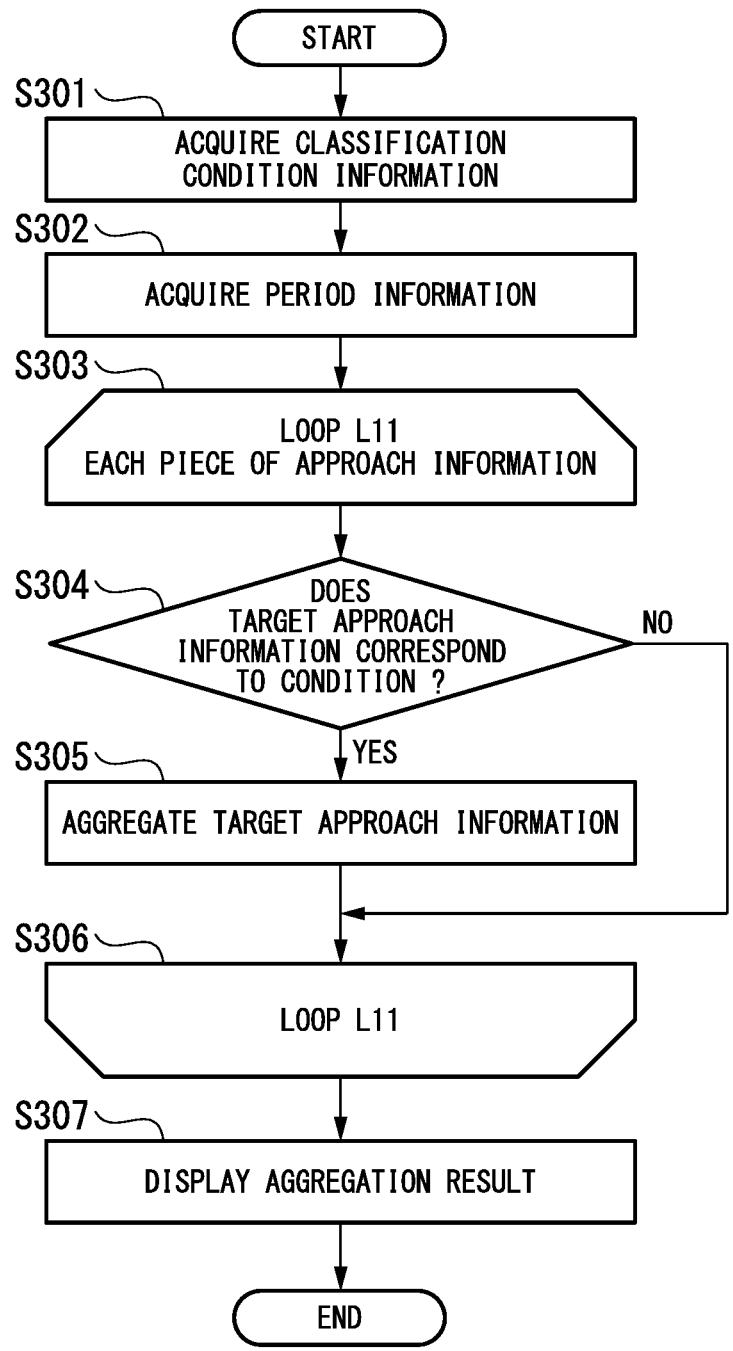
FIG. 9 is a flowchart showing an example of a processing procedure in which the behavior analysis device according to the embodiment classifies the approach information and calculates a customer behavior index value.

FIG. 9 is a flowchart showing an example of a processing procedure in which the behavior analysis device 200 classifies the approach information and calculates the customer behavior index value. When the behavior analysis device 200 receives a user operation for instructing to calculate the customer behavior index value, the behavior analysis device 200 is configured to perform the process of FIG. 9.

In the process of FIG. 9, the classification unit 295 acquires information indicating a classification condition for classifying the approach information (step S301). For example, the classification unit 295 reads the classification condition included in the user operation for instructing to calculate the customer behavior index value.

The classification unit 295 acquires period information indicating a period that is a target of calculation of the customer behavior index value (step S302). For example, the classification unit 295 reads the period information included in the user operation for instructing to calculate the customer behavior index value. When there is no period designation, the classification unit 295 may target all of pieces of the approach information stored in the storage unit 280.

The control unit 290 starts a loop L11 for performing a process on each piece of approach information corresponding to the period obtained in step S302 (step S303). Hereinafter, the approach information that is a processing target in the loop L11 is referred to a target approach information.

In the process of the loop L11, the classification unit 295 determines whether or not the target approach information corresponds to the classification condition obtained in step S301 (step S304). For example, when exclusion of a period in which certain goods are out of stock is the classification condition, the classification unit 295 reads the period from the stockout period information stored in the storage unit 280. In this case, since the condition is no correspondence to the read period, the classification unit 295 determines that the target approach information corresponds to the condition in step S304 (the classification condition obtained in step S301) when the classification unit 295 determines that the time indicated by the approach information is outside the stockout period.

When the classification unit 295 determines that the target approach information corresponds to the classification condition (step S304: YES), the analysis unit 296 is configured to perform aggregation of the target approach information (step S305). When the number of times the customer puts out the hand toward the goods is instructed to be counted for each of the goods, the analysis unit 296 adds 1 to the number of times the customer puts out the hand toward the goods indicated by the target approach information.

The control unit 290 is configured to perform a termination process of the loop L11 (step S306). Specifically, the control unit 290 determines whether the process has been completed for all of the approach information that is a processing target in the loop L11. When it is determined that the unprocessed approach information remains, the control unit 290 returns to step S303 and continues to perform the process of the loop L11 on the unprocessed approach information. When the control unit 290 has determined that the process has been completed for all of the approach information that is a processing target in the loop L11, the control unit 290 ends the loop L11.

When the control unit 290 ends the loop L11 in step S306, the analysis unit 296 causes the display unit 220 to display an aggregation result of the approach information (step S307). The control unit 290 ends the process of FIG. 9 after step S307.

In step S304, when the classification unit 295 determines that the target approach information does not correspond to the classification condition (step S304: NO), the control unit 290 proceeds to step S306.

As described above, the approach information acquisition unit 291 acquires approach information indicating whether or not a person has approached the shelves 910 on which the goods 920 have been displayed. The determination unit 293 determines the position and the stockout of the goods displayed on the shelves 910 as the stockout information. The analysis unit 296 is configured to perform the behavior analysis of the person on the basis of the approach information and the stockout information.

Accordingly, in the behavior analysis system 1, it is possible to reflect a stockout of goods in the behavior analysis of the customer in front of the shelves. According to the behavior analysis system 1, it is possible to perform more accurate behavior analysis in this respect.

The approach information includes information on the approach position indicating the position at which the hand of the person has approached in the shelves. The analysis unit 296 is configured to perform the behavior analysis of the person on the basis of the stockout information of the goods corresponding to the approach position. Accordingly, the behavior analysis system 1 can analyze a relationship between the goods toward which the person has put out the hand and the good that are out of stock, and can perform more detailed analysis in this respect.

When it is determined that the goods corresponding to the approach position are out of stock, the correction unit 294 is configured to perform correction to indicate that the hand of the person has approached a position adjacent to the approach position. The analysis unit 296 is configured to perform behavior analysis of the person on the basis of the correction of the correction unit 294.

Thus, in the behavior analysis system 1, it is possible to perform more accurate behavior analysis by the correction unit 294 correcting the position of the person (in particular, the position of the hand).

The analysis unit 296 is configured to ignore the approach information when it is determined that the goods corresponding to the approach position are out of stock.

Accordingly, in the behavior analysis system 1, it is possible to eliminate data when goods that are analysis targets are out of stock, as noise. According to the behavior analysis system 1, it is possible to perform the behavior analysis with higher accuracy in this respect.

The analysis unit 296 is configured to perform the behavior analysis of the person on the basis of the approach information when the determination unit 293 has determined that at least one of the goods is out of stock. Accordingly, in the behavior analysis system 1, it is possible to analyze the behavior of the customer when the goods are out of stock. For example, the user can recognize a substitute when certain goods are out of stock or whether or not the customer approaches the shelves when popular goods are out of stock by using the behavior analysis system 1.

The behavior analysis system may perform a process in which the stockout information has been used after performing the behavior analysis of the person.

Figure 10:
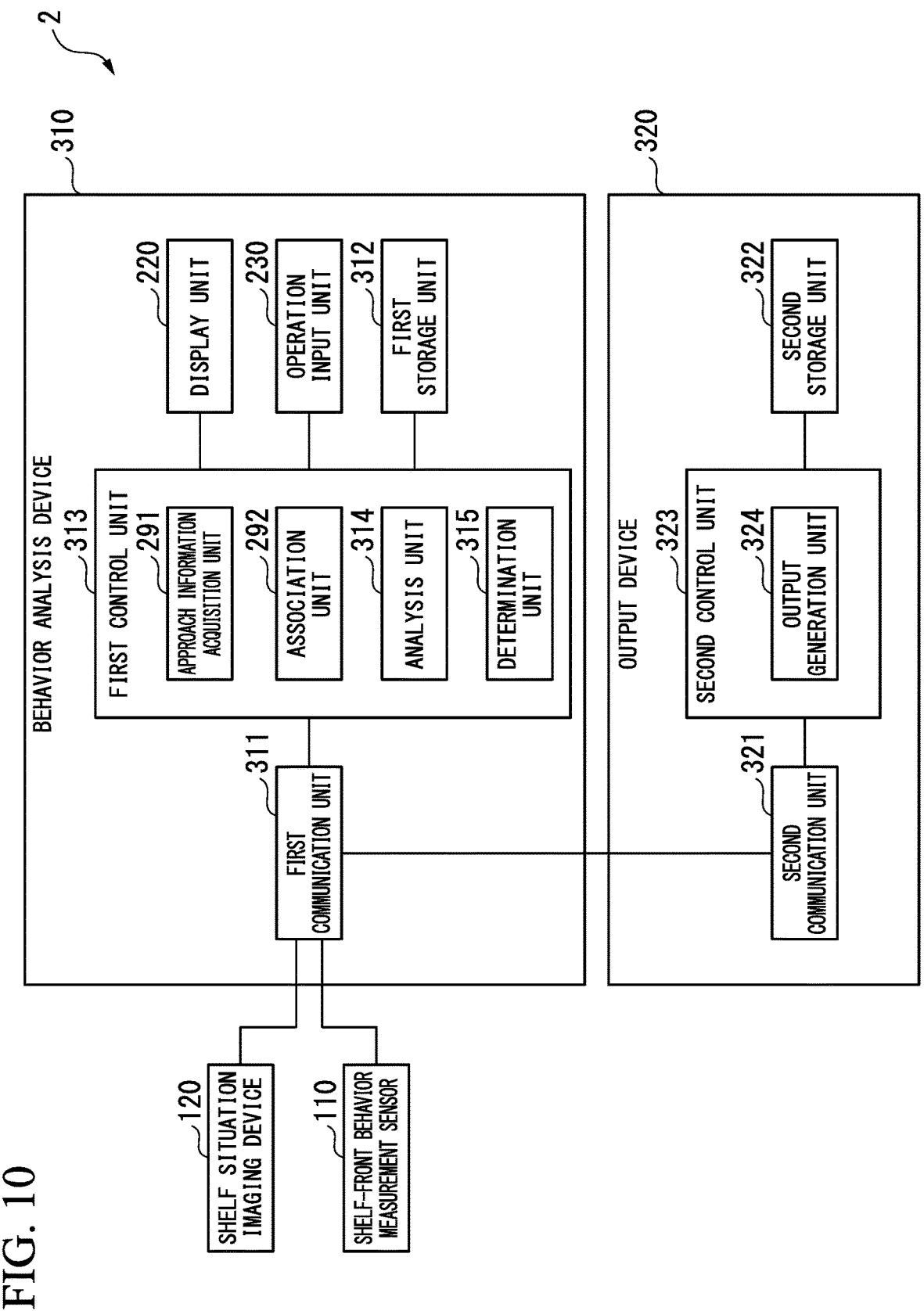
FIG. 10 is a schematic block diagram showing an example of a functional configuration in a case in which a behavior analysis system according to the embodiment performs a process in which stockout information is considered after behavior analysis of a person has been performed.

FIG. 10 is a schematic block diagram showing an example of a functional configuration of a behavior analysis system in a case in which a process in which the stockout information has been used after the behavior analysis of the person has been performed is performed. As shown in FIG. 10, the behavior analysis system 2 includes a shelf-front behavior measurement sensor 110, a shelf situation imaging device 120, a behavior analysis device 310, and an output device 320. The behavior analysis device 310 includes a first communication unit 311, a display unit 220, an operation input unit 230, a first storage unit 312, and a first control unit 313. The first control unit 313 includes an approach information acquisition unit 291, an association unit 292, an analysis unit 314 and a determination unit 315. The output device 320 includes a second communication unit 321, a second storage unit 322 and a second control unit 323. The second control unit 323 includes an output generation unit 324.

In the configuration of FIG. 10, the functions of the shelf-front behavior measurement sensor 110, the shelf situation imaging device 120, the display unit 220, the operation input unit 230, the approach information acquisition unit 291, and the association unit 292 are the same as those of the configuration of FIG. 1, are denoted with the same reference numerals as those in the case of FIG. 1, and description thereof will be omitted.

The behavior analysis device 310 is different from the behavior analysis device 200 of FIG. 1 in that the behavior analysis device 310 does not perform the process of reflecting a result of determining a stockout (a process of the determination unit 293) in the behavior analysis. This is because, in the configuration of FIG. 10, the output device 320 is configured to perform a process of reflecting the result of determining the stockout in the behavior analysis.

Since the behavior analysis and the determination of the stockout are separately performed, the behavior analysis device 310 also does not perform the correction of the position of the hand of the person (the process of the correction unit 294) and the classification of the approach information (the process of the classification unit 295). The behavior analysis device 310 is the same as the behavior analysis device 200 in FIG. 1 in other respects.

The first communication unit 311 communicates with other devices. In particular, the first communication unit 311 communicates with the shelf-front behavior measurement sensor 110 and receives sensor data. The first communication unit 311 communicates with the shelf situation imaging device 120 and receives imaging data. The first communication unit 311 communicates with the output device 320 and transmits the behavior analysis results in the behavior analysis device 310.

The first storage unit 312 stores various types of data, similar to the storage unit 280 in FIG. 1.

The first control unit 313 controls each unit of the behavior analysis device 310 to execute various processes, similar to the control unit 290 in FIG. 1.

The analysis unit 314 analyzes a behavior of a person on the basis of the approach information. The analysis unit 314 is configured to perform analysis such as, for example, determination of goods that a person who has picked up certain goods further picks up with his or her hand, using the post-association information generated by the association unit 292.

The determination unit 315 determines a position and a stockout of goods displayed on the shelves as stockout information, similar to the determination unit 293 in FIG. 1.

The output device 320 edits the analysis results of the behavior analysis device 310 on the basis of the situation of the stockout of the goods. Specifically, the output device 320 deletes information on a period of time in which the goods as analysis targets are out of stock as noise from the analysis results of the behavior analysis device 310.

The second communication unit 321 communicates with other devices. In particular, the second communication unit 321 communicates with the behavior analysis device 310 and receives the behavior analysis results of the behavior analysis device 310 and the result of determining the stockout. Further, the second communication unit 321 transmits the output of the output device 320 (the behavior analysis results edited by the output device 320) to the other device.

The second storage unit 322 stores various types of data.

The second control unit 323 controls each unit of the output device 320 to execute various processes.

The output generation unit 324 deletes the information on the period of time in which the goods as analysis targets are out of stock as noise from the analysis results of the behavior analysis device 310. The output generation unit 324 generates output information obtained by deleting the noise from the analysis results.

Thus, in the behavior analysis system 2, the information on the period of time in which the goods as analysis targets are out of stock is deleted as noise from the behavior analysis results of the person (customer) in front of the shelves. According to the behavior analysis system 2, it is possible to perform more accurate behavior analysis in this respect.

Next, a minimum configuration of the present invention will be described with reference to FIGS. 11 and 12.

Figure 11:
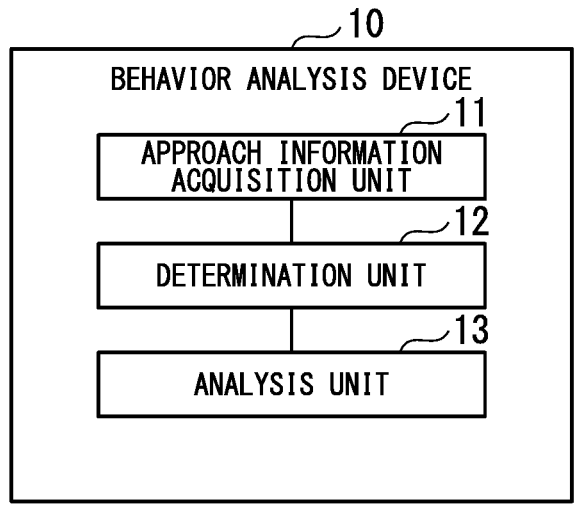
FIG. 11 is an illustrative diagram showing a minimum configuration of the behavior analysis device according to the present invention.

FIG. 11 is an illustrative diagram showing a minimum configuration of the behavior analysis device according to the present invention. The behavior analysis device 10 shown in FIG. 11 includes an approach information acquisition unit 11, a determination unit 12 and an analysis unit 13. With such a configuration, the approach information acquisition unit 11 acquires the approach information indicating whether or not the person has approached the shelves on which the goods are displayed. The determination unit 12 determines the position and the stockout of the goods displayed on the shelves as the stockout information. The analysis unit 13 is configured to perform the behavior analysis of the person on the basis of the approach information and the stockout information.

Accordingly, in the behavior analysis device 10, it is possible to reflect the situation of the stockout of the goods in the behavior analysis of the customer in front of the shelves. According to the behavior analysis device 10, it is possible to perform the behavior analysis with higher accuracy in this respect.

Figure 12:
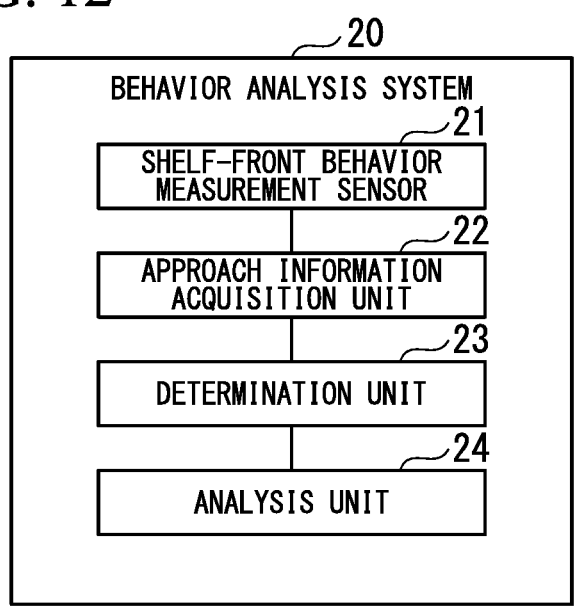
FIG. 12 is an illustrative diagram showing a minimum configuration of the behavior analysis system according to the present invention.

FIG. 12 is an illustrative diagram showing a minimum configuration of the behavior analysis system according to the present invention. The behavior analysis system 20 shown in FIG. 12 includes a shelf-front behavior measurement sensor 21, an approach information acquisition unit 22, a determination unit 23 and an analysis unit 24.

In such a configuration, the shelf-front behavior measurement sensor 21 determines the approach of the person to the shelves on which the goods are displayed. The approach information acquisition unit 22 acquires the approach information indicating whether or not the person has approached the shelves on which the goods are displayed on the basis of the sensing data of the shelf-front behavior measurement sensor. The determination unit 23 determines the position and the stockout of the goods displayed on the shelves as the stockout information. The analysis unit 24 is configured to perform the behavior analysis of the person on the basis of the approach information and the stockout information.

Accordingly, in the behavior analysis system 20, it is possible to reflect the situation of the stockout of goods in the behavior analysis of the customer in front of the shelves. According to the behavior analysis system 20, it is possible to perform the behavior analysis with higher accuracy in this respect.

The process of each unit may be performed by recording a program for realizing all or some of the functions of the control unit 290, the approach information acquisition unit 11, the determination unit 12, the analysis unit 13, the approach information acquisition unit 22, the determination unit 23 and the analysis unit 24 on a computer-readable recording medium, loading the program recorded on the recording medium into a computer system, and executing the program. The "computer system" referred to herein includes hardware such as an OS or a peripheral device.

The "computer-readable recording medium" refers to a storage medium such as a flexible disk, a magneto-optical disc, a ROM, a portable medium such as a CD-ROM, or a hard disk built into a computer system. Further, the above program may be a program for realizing some of the above-described functions, and may be a program capable of realizing the above-described functions in combination with a program already recorded in a computer system.

Although the embodiments of the present invention have been described above in detail with reference to the drawings, a specific configuration is not limited to the embodiments, and designs and the like within the scope not departing from the gist of the present invention are included.

Priority is claimed on Japanese Patent Application No. 2016-059300, filed Mar. 23, 2016, the content of which is incorporated herein by reference.

INDUSTRIAL APPLICABILITY

The present invention can be applied to applications in which it is indispensable to reflect the situation the stockout of the goods in the behavior analysis.

REFERENCE SIGNS LIST 1, 2, 20 Behavior analysis system
10, 200, 310 Behavior analysis device
11, 22, 291 Approach information acquisition unit
12, 23, 293, 315 determination unit
13, 24, 296, 314 Analysis unit
21, 110 Shelf-front behavior measurement sensor
120 Shelf situation imaging device
210 Communication unit
220 Display part
230 Operation input unit
280 Storage unit
290 Control unit
292 Association unit
294 Correction unit
295 Classification unit
311 First communication unit
312 First storage unit
313 First control unit
320 Output device
321 Second communication unit
322 Second storage unit
323 Second control unit
324 Output generation unit

The invention claimed is:

1. A behavior analysis system comprising:
at least one memory configured to store instructions; and
at least one processor configured to execute the instructions to:
obtain images of a shelf on which a plurality of goods are displayed;
acquire approach information, indicating whether or not a person has approached the shelf and including information on an approach position indicating a position at which a hand of the person has approached in the shelf, by analyzing one or more of the images;
determine as stockout information a position of a stockout item which is out of stock among the plurality of goods displayed on the shelf and a stockout of the stockout item by comparing a plurality of the images and determining that the stockout item is, in at least one of the images, absent from the shelf;
generate corrected approach information by correcting the approach information to indicate that the hand of the person has approached a position adjacent to the approach position when it is determined that one of the plurality of goods corresponding to the approach position is out of stock;
perform a behavior analysis of the person on the basis of the corrected approach information and the stockout information of one of the plurality of goods corresponding to the approach position;
generate a display image by modifying an image of the shelf, among the images of the shelf, based on at least a result of the behavior analysis; and
control a display of the display image,
wherein the display image is generated by at least overlaying a heat map onto the image of the shelf, and
wherein heat map is based on the result of the behavior analysis.

2. The behavior analysis system according to claim 1, wherein
the at least one processor is configured to execute the instructions to ignore the approach information when it is determined that one of the plurality of goods corresponding to the approach position is out of stock.

3. The behavior analysis system according to claim 1, further comprising:
a sensor configured to determine approach of a person to the shelf as the approach information.

4. A behavior analysis system comprising a behavior analysis device and an output device,
wherein the behavior analysis device includes:
at least one first memory configured to store first instructions; and
at least one first processor configured to execute the first instructions to:
obtain images of a shelf on which a plurality of goods are displayed;
acquire approach information, indicating whether or not a person has approached the shelf and including information on an approach position indicating a position at which a hand of the person has approached in the shelf, by analyzing the images;
determine as stockout information a position of a stockout item which is out of stock among the plurality of goods displayed on the shelf and a stockout of the stockout item by comparing a plurality of the images and determining that the stockout item is, in at least one of the images, absent from the shelf;

generate corrected approach information by correcting the approach information to indicate that the hand of the person has approached a position adjacent to the approach position when it is determined that one of the plurality of goods corresponding to the approach position is out of stock; and perform a behavior analysis of the person on the basis of the corrected approach information and the stockout information of one of the plurality of goods corresponding to the approach position, and wherein the output device includes:
at least one second memory configured to store second instructions; and
at least one second processor configured to execute the second instructions to generate and control a display of output information on the basis of the stockout information acquired from the behavior analysis device and analysis results of the behavior analysis device, wherein the output information is generated by modifying an image of the shelf, among the images, based on at least a result of the behavior analysis, wherein the display image is generated by at least overlaying a heat map onto the image of the shelf, and wherein heat map is based on the result of the behavior analysis.

5. A behavior analysis method comprising:
obtain images of a shelf on which a plurality of goods are displayed;

an approach information acquisition step of acquiring approach information, indicating whether or not a person has approached the shelf and including information on an approach position indicating a position at which a hand of the person has approached in the shelf, by analyzing one or more of the images;

a stockout determination step of determining as stockout information a position of a stockout item which is out of stock among the plurality of goods displayed on the shelf and a stockout of the stockout item by comparing a plurality of the images and determining that the stockout item is, in at least one of the images, absent from the shelf;

a correction step of generating corrected approach information by correcting the approach information to indicate that the hand of the person has approached a position adjacent to the approach position when it is determined that one of the plurality of goods corresponding to the approach position is out of stock;

an analysis step of performing a behavior analysis of the person on the basis of the corrected approach information and the stockout information of one of the plurality of goods corresponding to the approach position;

a generating step of generating a display image by modifying an image of the shelf, among the images, based on at least a result of the behavior analysis; and a controlling step of controlling a display of the display image, wherein the display image is generated by at least overlaying a heat map onto the image of the shelf, and wherein heat map is based on the result of the behavior analysis.

\* \* \* \* \*